Patented Mar. 24, 1936

2,035,318

UNITED STATES PATENT OFFICE 2,035,318

METHOD OF FINING BOROSILICATE GLASSES

Harrison P. Hood, Corning, N. Y., assignor to Corning Glass Works, Corning, N. Y., a corporation of New York No Drawing. Application May 8, 1934, Serial No. 724,617

7 Claims. (Cl. 106—36.1)

This invention relates to glass and more particularly to borosilicate glasses, which term as hereinafter used refers to glasses having a silica content of at least 70%, a boric oxide content of at least 5% and containing first group alkali with or wihout other constituents.

The fining of non-borosilicates, especially those which have a relatively high alkali content and a relatively low viscosity at 1350° C., is more or less easily accomplished, but the fining of borosilicate glasses is a more difficult matter. This may be due in part to the fact that borosilicate glasses normally have a relatively higher water content than ordinary glasses, as is set forth on page 430 of a publication entitled "Gases in Glass" by R. H. Dalton, in the Journal of the American Ceramic Society, vol. 16, pages 425–432 (1933). The high water content of borosilicates is probably derived from batch materials such as boric acid ($H_3BO_3$) or borax ($Na_2B_4O_7 \cdot 10H_2O$), their water of constitution not being eliminated at as low temperatures as is ordinary moisture.

The use of arsenic and nitre is the only satisfactory means known for fining such glasses, and other means have long been desired since there are certain objections to the use of arsenic in borosilicate glasses, especially those glasses which are used for laboratory ware.

It is the object of this invention to fine borosilicate glasses efficiently and economically without the use of arsenic.

I have discovered that borosilicate glasses can be fined with remarkable efficiency by introducing into the batches therefor in lieu of arsenic and nitre a substantial percentage of a chloride salt, such as sodium chloride, and melting the batches under proper conditions as will later appear. I have also found that borosilicate glasses which have been fined by my method have a lower gas content and a higher ultra-violet transmission than prior borosilicate glasses which have been fined through the use of arsenic and nitre.

Heretofore it has been the general belief that when sodium chloride is introduced into borosilicate glass it causes opalescence of the glass. I have found that such opalescence occurs only when the batch is melted at a relatively low temperature and particularly also when the sand of the batch is finely pulverized. I believe that such opalescence is caused by retention of the sodium chloride, whereby the glass is completely saturated therewith and a homogeneous dispersion of countless microscopic droplets of sodium chloride takes place during melting.

I have now discovered that chlorides, such as sodium chloride, are excellent fining agents for borosilicate glasses, provided that the batches contain a substantial percentage of the chloride and are melted under conditions that will prevent the formation of minute droplets of sodium chloride in the glass and that such conditions comprise melting under atmospheric pressure at a temperature in excess of 1400° C., preferably in a tank furnace.

Although I am able to fine borosilicate glasses having a relatively high alkali content, my invention is of great value in the fining of low expansion borosilicates of low alkali content; for example, one having approximately the following composition:

A

| | |
|---|---|
| $SiO_2$ | 80. % |
| $B_2O_3$ | 13.5% |
| $Na_2O$ | 4.5% |
| $Al_2O_3$ | 2.0% |

I find that the addition of about 3% of sodium chloride or other equivalent chloride to the batch for a glass of the above recited composition without arsenic or nitre will cause rapid fining of such glass when melted in a tank furnace of the usual size under atmospheric pressure at approximately 1500°–1600° C. for the usual length of time, i. e., at the rate of about 25 tons of glass per 24 hours. It is not possible to state a definite concentration of chloride above which rapid fining is obtained and below which there is no fining. Under 1% of sodium chloride in the above instance does not cause rapid enough fining for practical purposes, although fining can undoubtedly be accomplished by using a somewhat higher temperature or longer melting time. I therefore consider 1% of chloride to be the minimum which is suitable for my purpose, and I find that when this amount is used for fining a low expansion borosilicate glass of the above mentioned type the residual chlorine content of the finished glass is not less than .05% chlorine. Of course, minute amounts of chloride are sometimes present in batch constituents as an impurity, especially in the alkali materials, but such impurity is entirely insufficient to accomplish my result. Amounts of chloride greater than 3% give good results and I have successfully used up to 10% in the above mentioned glass, there being in the latter case a residual content of about .15% chlorine in the finished glass. Borosilicates of higher alkali content will retain somewhat larger amounts of chlorine. For the larger amounts of fining agent, the conditions, such as temperature and melting time, seem to be substantially the same as the conditions for 3%. It will therefore be seen that various amounts of chloride are suitable for my purpose and I do not desire to be limited, except as specified in the claims. Other chlorides, when used in equivalent amounts, will produce the same result, for example, potassium chloride, aluminum chloride, zinc chloride, etc.

A borosilicate glass which has been melted under highly oxidizing conditions, such as one which has been fined through the use of arsenic and nitre, possesses a higher ferric to ferrous oxide ratio than the same glass which is neutral or, in other words, which is neither oxidized nor reduced. The neutral glass should therefore possess a higher ultra-violet transmission than the oxidized glass. I have found that borosilicates which have been fined through the use of chloride without oxidizing or reducing agents and which may therefore be termed neutral glasses, actually have a higher ultra-violet transmission and appear more bluish in color when viewed in thick section than borosilicates which have been fined with arsenic.

In order to show that borosilicate glasses fined by my method have a lower gas content and a lower ferric to ferrous oxide ratio than glasses fined by arsenic, I give the following table which shows the gas contents and ultra-violet transmissions of the two glasses of the above recited composition A, one of which was fined in the usual manner through the use of arsenic and nitre and the other of which was fined by addition to the batch of 3% of sodium chloride with no arsenic or nitre. The gas analyses were made in accordance with the method described in the above mentioned publication of R. H. Dalton.

| | Fined with arsenic and nitre | Fined with 3% of sodium chloride |
|---|---|---|
| c.c. of gas, standard conditions per 100 grams of glass: | | |
| $H_2O$ | 39 c.c. | 24 c.c. |
| Residue | 4. c.c. | 2.2 c.c. |
| Transmission at 302 $\mu\mu$, 2 mm. thick | 6.% | 52.% |
| Final chlorine content as Cl | .019% | .118% |

From this it will be seen that borosilicates which have been fined by my process have a lower gas content and a higher ultra-violet transmission than those which have been fined through the use of arsenic and nitre.

My method is also useful in fining reduced borosilicate glasses, such as heat absorbing borosilicate glasses which contain ferrous iron and must be melted with strong reduction. Heretofore great difficulty has been experienced in the fining of such glasses, since arsenic and nitre are of no avail in reduced glasses and no satisfactory means is generally known for fining them. My researches indicate that the difficulty may be due to the following chemical reaction which probably takes place in the reduced glasses when held at a high temperature: $2FeO+H_2O=Fe_2O_3+H_2$. At high temperatures the ferrous oxide, which may be present as an impurity or which may be present as a heat absorbing agent in the case of heat absorbing glasses, reacts with the water, resulting in the continuous formation of gaseous hydrogen which is slowly evolved as long as the water content of the glass is sufficiently large to promote this reaction. If the water content can be sufficiently decreased by suitable means such as, for example, by the addition of chloride to the batch, then the glass will fine readily. The same type of reaction may also occur between $CO_2$ which is dissolved in the glass and FeO, the resulting bubbles consisting of CO.

Although chlorine is considered an oxidizing agent and, when present in glass as the chloride, is said to oxidize the iron, I have been unable to substantiate this, but, on the contrary, I have found that heat absorbing borosilicates can be fined with chloride without causing any appreciable oxidation of the iron, provided the batch contains an excess of reducing agent. I have also found that borosilicate batches which contain an excess of reducing agent and a substantial percentage of a chloride salt can be fined efficiently when melted in pots of either the closed or open type. The following composition as calculated from the batch is an example of a heat absorbing borosilicate glass containing ferrous iron which I have fined by this means:

B

| | |
|---|---|
| $SiO_2$ | 75 |
| $Na_2O$ | 6 |
| $B_2O_3$ | 9 |
| ZnO | 6 |
| CaO | 2 |
| FeO | 1 |
| $Al_2O_3$ | 1 |

This glass, which is ordinarily very difficult to fine, may be fined satisfactorily by an addition to the batch of from 2–5% of sodium chloride. The addition of such a large amount of chloride apparently causes no appreciable loss of iron through the volatilization of iron chloride, and there is no appreciable change in the color nor decrease in heat absorbing efficiency provided an excess of reducing agent, such as carbon, is present in the batch. In fining the above glass I have found that .5% of carbon or other reducing agent equivalent thereto is sufficient in ordinary melting in closed pots, although, under other conditions such as when using open pots or a tank furnace, more may be required.

I claim:

1. The method of making a reduced borosilicate glass which is substantially free from bubbles, which includes adding to the batch therefor from 2% to 5% of a chloride and a sufficient amount of reducing agent to keep the iron reduced and to counteract any oxidizing action of the chloride, and melting the batch under conditions which will vaporize and drive off a substantial part of the chloride.

2. The method of making a heat absorbing borosilicate glass containing ferrous iron which is substantially free from bubbles, which includes adding to the batch therefor from 2% to 5% of sodium chloride and a sufficient amount of reducing agent to keep the iron reduced and to counteract any oxidizing action of the chloride, and melting the batch under conditions which will vaporize and drive off a substantial part of the chloride.

3. A transparent heat resisting borosilicate glass which is substantially free from bubbles and which shows by analysis the presence of from .05% to .2% of chlorine, and which contains by analysis less than 30 cc. of water vapor calculated to standard conditions of temperature and pressure per 100 grams of glass.

4. A transparent borosilicate glass in which the polyvalent elements, such as iron, are predominantly in the lowest state of reduction and which shows by analysis the presence of chlorine in an amount which lies between .05% and .20% of the finished glass.

5. A heat absorbing borosilicate glass which contains ferrous iron and which shows by analysis the presence of at least .05% of chlorine.

6. A batch for a heat absorbing borosilicate glass which contains an iron compound, an alkali chloride, and a sufficient amount of reducing agent to cause maximum reduction of the iron and to counteract any oxidizing action of the chloride.

7. A heat absorbing borosilicate glass which contains ferrous iron and which shows by analysis the presence of not less than .05% and not more than .20% chlorine.

HARRISON P. HOOD.